May 8, 1928.
E. F. W. ALEXANDERSON ET AL
1,669,153
CONTROL SYSTEM
Filed May 17, 1926
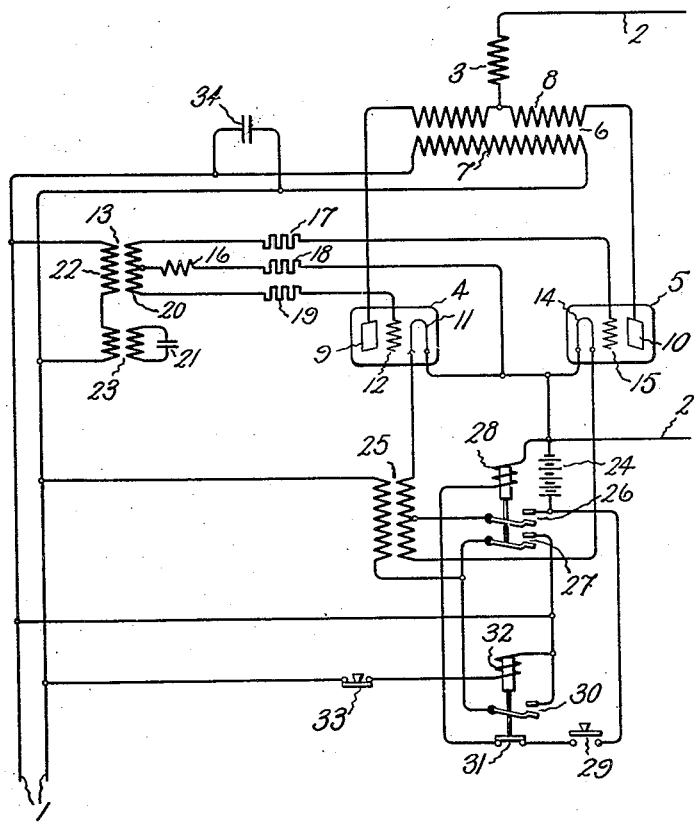
Inventors:
Ernst F. W. Alexanderson,
Samuel P. Nixdorff,
by *Alexander S. Lenz*
Their Attorney.

Patented May 8, 1928.

1,669,153

UNITED STATES PATENT OFFICE.

ERNST F. W. ALEXANDERSON AND SAMUEL P. NIXDORFF, OF SCHENECTADY, NEW YORK, ASSIGNORS TO GENERAL ELECTRIC COMPANY, A CORPORATION OF NEW YORK.

CONTROL SYSTEM.

Application filed May 17, 1926. Serial No. 109,543.

Our invention relates to systems for transmitting current between different electrical circuits, and has for its principal object the provision of an improved method and means for controlling the operation of such systems.

Various systems have been prepared for transmitting current either between direct current circuits operated at different voltages or between direct and alternating current circuits. Many of these systems comprise a transformer for determining the relation between the circuit voltages and electron discharge means for rectifying or derectifying the current transmitted between the circuits. It is desirable that such systems be provided with means whereby they may be readily and economically controlled. In accordance with our invention, the transmission of current between the circuits is controlled by an apparatus comprising one means for initiating a discharge of electrons from the cathode of the electron discharge device and another means operable in response to energization of one of the circuits for maintaining this discharge of electrons.

Our invention will be better understood from the following description when considered in connection with the accompanying drawing, and its scope will be pointed out in the appended claims.

The drawing illustrates the application of our invention to a system for transmitting current between direct and alternating current circuits.

This system comprises alternating current leads 1 and direct current leads 2 which are interconnected through means comprising a smoothing reactor 3, electron discharge devices 4 and 5, and a transformer 6 provided with a secondary circuit 7 connected to the alternating current leads 1 and with a primary circuit 8 connected at its opposite ends to the anodes 9 and 10 of the devices 4 and 5 respectively. The device 4 comprises a cathode 11 and a grid 12 which are interconnected through the secondary circuit of a transformer 13. The device 5 comprises a cathode 14 and a grid 15 which are likewise interconnected through the transformer 13. It will be noted that the cathodes 11 and 14 are connected to one side of the circuit 2 and that a smoothing reactor 16 and resistors 17, 18 and 19 are interposed between the devices 4 and 5 and the secondary circuit 20 of the transformer 13.

In the operation of a system of the type illustrated, it is necessary for satisfactory operation that one of the electron discharge devices should be made conducting by the application of a positive potential to its grid before the current of the other device has been interrupted. This requires that the positive voltage alternately applied to the grids 12 and 15 should lead the voltage of the secondary circuit 7. In the illustrated embodiment of the invention, the desired lead is secured by means of a capacitor 21 connected to the alternating current leads 1 in series with the primary winding 22 of the grid transformer 13. In order to step down the current and permit the use of a smaller capacitor, a transformer 23 may be interposed between the capacitor and the primary circuit.

A source shown as a battery 24 is provided for heating the cathodes 11 and 14 to produce a supply of electrons whereby the transmission of current from the circuit 2 to the circuit 1 is started and a transformer 25 connected between the alternating circuit 1 and the cathodes is provided for heating the cathodes to maintain the supply of electrons after the circuit 1 is energized. It will be observed that a relay switch comprising contacts 26 and 27 and an operating coil 28 arranged to be energized by the source 24 in response to closure of a switch 29 is provided for connecting the cathodes 11 and 14 to the source 24 and for completing the connection between the primary circuit of the transformer 25 and the circuit 1; and that a relay switch comprising main and back contacts 30 and 31 and an operating coil 32 connected through a switch 33 to the circuit 1 is provided for interrupting the circuit of the operating coil 28 and maintaining the connection between the circuit 1 and the transformer 25. The operating frequency of the circuit may be determined by any suitable means, such as a condenser 34 for example.

Assuming the various switches to be in their illustrated positions, current is not transmitted from the direct current circuit 2 to the alternating circuit 1 for the reason that no heating current is supplied to the cathodes of devices 4 and 5 and the supply of electrons at these cathodes is insufficient to permit the transmission of current through the devices. Current is started through the devices 4 and 5, by closing switch 29 thereby energizing the operating coil 28 and completing connections both between the source 24 and the cathodes and between the transformer 25 and the circuit 1. When current starts through the devices 4 and 5, the operating coil 32 is energized, contact 31 is opened, coil 28 is deenergized, the contacts 26 and 27 are opened and heating current is thereafter supplied to the cathodes through the transformer 25.

The embodiment of the invention illustrated and described herein has been selected for the purpose of clearly setting forth the principles involved. It will be apparent, however, that the invention is susceptible of being modified to meet the different conditions encountered in its use, and we therefore aim to cover by the appended claims all modifications within the true spirit and scope of our invention.

What we claim as new and desire to secure by Letters Patent of the United States, is:—

1. The combination of a plurality of electrical circuits, means comprising an electron discharge device provided with a cathode for transmitting current between said circuits, manual control means for initiating a supply of electrons at said cathode, and means operable in accordance with the energization of one of said circuits for maintaining the supply of electrons at said cathode.

2. The combination of supply and distribution circuits, means comprising an electron discharge device provided with a cathode for transmitting current between said circuits, and means operable in response to energization of said distribution circuit for completing between said distribution circuit and said cathode a connection whereby a supply of electrons is maintained at said cathode.

3. The combination of a plurality of electrical circuits, means comprising an electron discharge device provided with a cathode for transmitting current between said circuits, a source of current, means for interconnecting said source and said cathode to initiate a supply of electrons at said cathode, and means operable in response to energization of one of said circuits for interrupting the connection between said source and cathode and completing between said energized circuit and said cathode a connection whereby a supply of electrons is maintained at said cathode.

4. The combination of a plurality of electrical circuits, means comprising an electron discharge device provided with a cathode for transmitting current between said circuits, a source of current, manual control means for interconnecting said source and cathode to initiate a supply of electrons at said cathode, means operable in response to energization of one of said circuits for interrupting the connection between said source and cathode and connecting said cathode to said energized circuit, and manual control means for interrupting the connection between said energized circuit and said cathode.

5. The combination of a plurality of electrical circuits, means comprising an electron discharge device provided with a cathode and an anode for transmitting current between said circuits and with a grid for controlling the transmission of said current, means for initiating a supply of electrons at said cathode, means operable in response to energization of one of said circuits for maintaining a supply of electrons at said cathode, and means for controlling the potential of said grid in accordance with the voltage of said energized circuit.

In witness whereof, we have hereunto set our hands this 15th day of May, 1926.

ERNST F. W. ALEXANDERSON.
SAMUEL P. NIXDORFF.